United States Patent [19]

Holik

[11] 3,795,473

[45] Mar. 5, 1974

[54] APPARATUS FOR THE AUTOMATIC PRODUCTION OF BRAKE SHOES AND LININGS

[75] Inventor: Karl Holik, Wolfern bei Steyr, Austria

[73] Assignee: FA. Automatisationsanlagenprojektierungs & Bauges m.b.H., Wolfern bei Steyr, Austria

[22] Filed: June 26, 1972

[21] Appl. No.: 266,391

[30] Foreign Application Priority Data
Jan. 5, 1971  Austria .................. 5782/71

[52] U.S. Cl. ............... 425/506, 425/112, 425/126, 425/324, 425/515
[51] Int. Cl. ..................... B29c 27/14, B29c 3/04
[58] Field of Search ...... 425/109, 14, DIG. 20, 195, 425/324, 348, 360, DIG. 260, 112, 126; 264/112, 297, DIG. 57

[56] References Cited
UNITED STATES PATENTS

| 2,593,668 | 4/1952 | Gora | 425/DIG. 24 |
|---|---|---|---|
| 2,881,475 | 4/1959 | Wilckens | 425/809 X |
| 2,952,035 | 9/1960 | Gora | 425/DIG. 24 |
| 3,007,197 | 11/1961 | Grover | 425/DIG. 24 |
| 3,360,827 | 1/1968 | Aichele | 425/112 X |
| 3,407,442 | 10/1968 | Wright | 425/126 X |
| 3,439,718 | 4/1969 | Wright et al. | 425/455 |
| 3,635,619 | 1/1972 | Armstrong et al. | 425/112 |

Primary Examiner—Robert L. Spicer, Jr.
Attorney, Agent, or Firm—Young & Thompson

[57] ABSTRACT

Apparatus for the automatic production of brake shoes and linings comprising an intermittently rotatable table that carries a plurality of hot presses. Brake lining compound is masticated, preheated, comminuted and fed to a pelletizing press, a pellet being fed from the pelletizing press to each hot press on the table during a dwell in the rotary indexing movement of the table. A backing plate for the lining is also fed to each press beneath the pellet. Each hot press is so constructed to apply first a relatively low closing pressure and then a relatively high operating pressure. A vertically movable mold above a heating plate encompasses the die held by a vertically movable die holding plate; but the relative vertical movement is limited so that the die cannot escape the mold during operation.

10 Claims, 6 Drawing Figures

APPARATUS FOR THE AUTOMATIC PRODUCTION OF BRAKE SHOES AND LININGS

This invention relates to apparatus for the automatic production of brake shoes and linings.

Heretofore, brake shoes and linings have generally been manufactured by pressing and/or sintering in multistage die presses. The feeding of the brake lining compound is effected manually in most cases; the compound is introduced into so-called preforming molds wherein pressing in the cold state is executed. In this manner, preforms or blanks are produced which are later pressed in the hot state.

However, the exact metering of the brake lining compound, as well as the handling of the preforms is time-consuming. Also, pressing in the multistage die presses results in difficulties. The pressing operation is generally conducted in such a manner that the backing plate is either processed concomitantly during the preliminary pressing step, or is fed only in the hot-press phase. Depending on the size of the lining, a different number of brake shoes are pressed in one stage of a press. But in the multistage press, it is impossible to guide the die with such a high degree of accuracy that the lining is pressed in well-defined chambers, and an absolutely identical filling is likewise impossible. As a result, each lining differs in thickness from the other linings by a minor amount. On the one hand, some linings are pressed with a greater degree of firmness, and some linings are pressed to a lesser extent, and, on the other hand, due to the use of planar die plates, the compounds are partially compressed upwardly, so that a large ridge is produced, ensuing in waste. Furthermore, a constant degree of compression cannot be attained over the entire surface of the lining. Moreover, in this manufacturing method, a number of manual operations must be executed. The press time must be chosen to be relatively long, because, due to the introduction of the brake shoes, the very large-volume molds and die press plates cool off and must first be warmed up again during the press cycle.

Generally speaking, only the intermediate plates disposed below and above the mold are heated, and so the heat transfer to the brake lining compound takes place only through the contact points on the backing plate and on the lining surface. The heating of the core takes place only to a very insufficient extent. For the foregoing reasons, it is also impossible to press rainwater grooves into the article during the pressing operation.

The present invention solves the problem of manufacturing disc brake linings in a fully automatic manner while eliminating the technical difficulties which have occurred heretofore, i.e. attaining a completely uniform heating of the lining material, as well as ensuring a completely uniform pressure distribution during the pressing step. Furthermore, the invention ensures that the lining mold does not cool off during the feeding and discharging thereof, but rather is heated directly.

It is an important feature of this invention that several hot presses are disposed on a first rotary table movable cyclically. Additional assemblies are arranged for feeding preformed pellets of brake lining compound to the hot presses. Preferably, at least one pelletizing press is disposed on a second rotary table with a metering device for the brake lining compound and a device for preheating the pellets. A device for the feeding and preheating of the backing plates may also be provided.

The heart of the apparatus is the hot press zone. On the rotary table provided in this zone, there may be, say, 24 hot presses, which permit the hot pressing time to be relatively long compared to the total cycle time. Even shorter cycle times are possible if the backing plate is preheated as well as the brake lining compound, and the molds proper are always kept in a heated condition.

In each press, only one disc brake lining is processed at a time. By means of interchangeable press mold parts which can be installed depending on the shape of the lining to be produced, the structure of the apparatus is so simple low cost is achieved. The press molds can be produced within very narrow ranges of tolerance with highly polished surfaces so that the quality of the products meets the highest requirements.

If backing plates are used, they can be withdrawn from a stack magazine and automatically introduced into the machine. Additional magazines can also be provided so that the supply of backing plates will be sufficient for an entire work shift, or even longer. The uppermost backing plate is fed from the magazine, so that it is also possible to process non-planar backing plates. The backing plate is first coated with a bonding agent with the aid of an applicator. This bonding agent is subsequently pre-hardened in a continuous oven, during which step the carrier plates are simultaneously preheated to about 70°–80° C. The preheating temperature can be set with the aid of precision thermostats. After curing, the plates are introduced into the hot press together with the pellets coming from the automatic pelletizer.

Other features and advantages of the invention will become apparent from a consideration of the following description, taken in connection with the accompanying drawings, which show somewhat schematically an embodiment of the present apparatus for the automatic production of disc brake linings, omitting the parts which are not essential to the invention.

Figure 1:
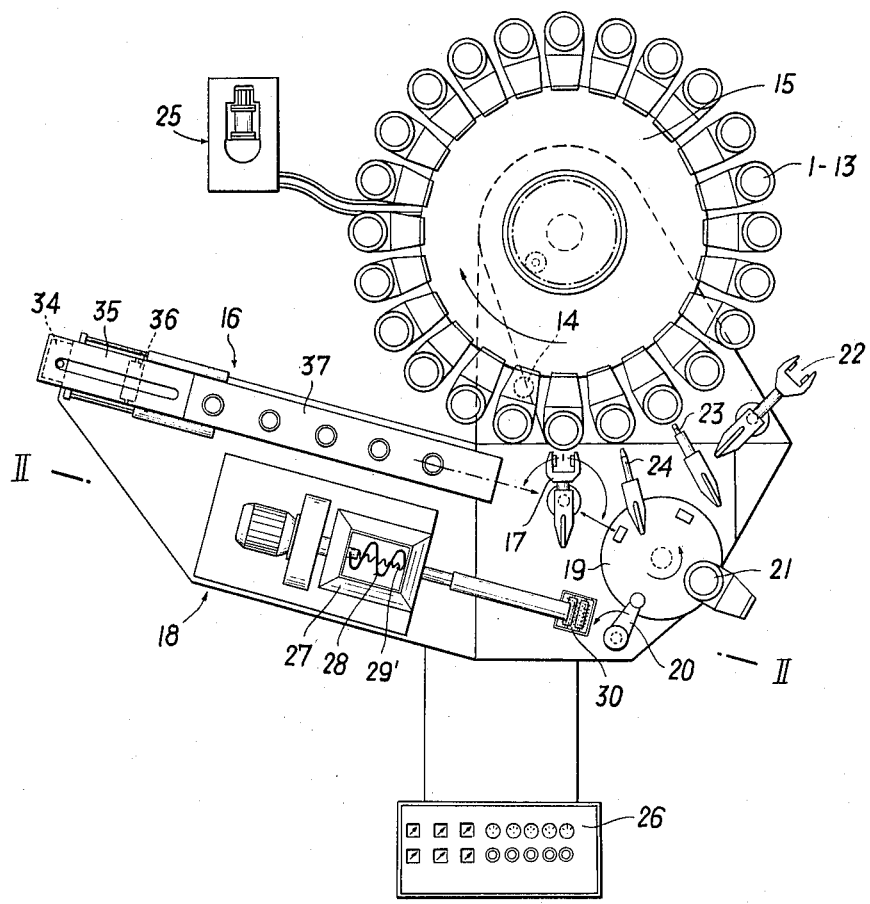
FIG. 1 is a plan view of the apparatus.
Figure 2:
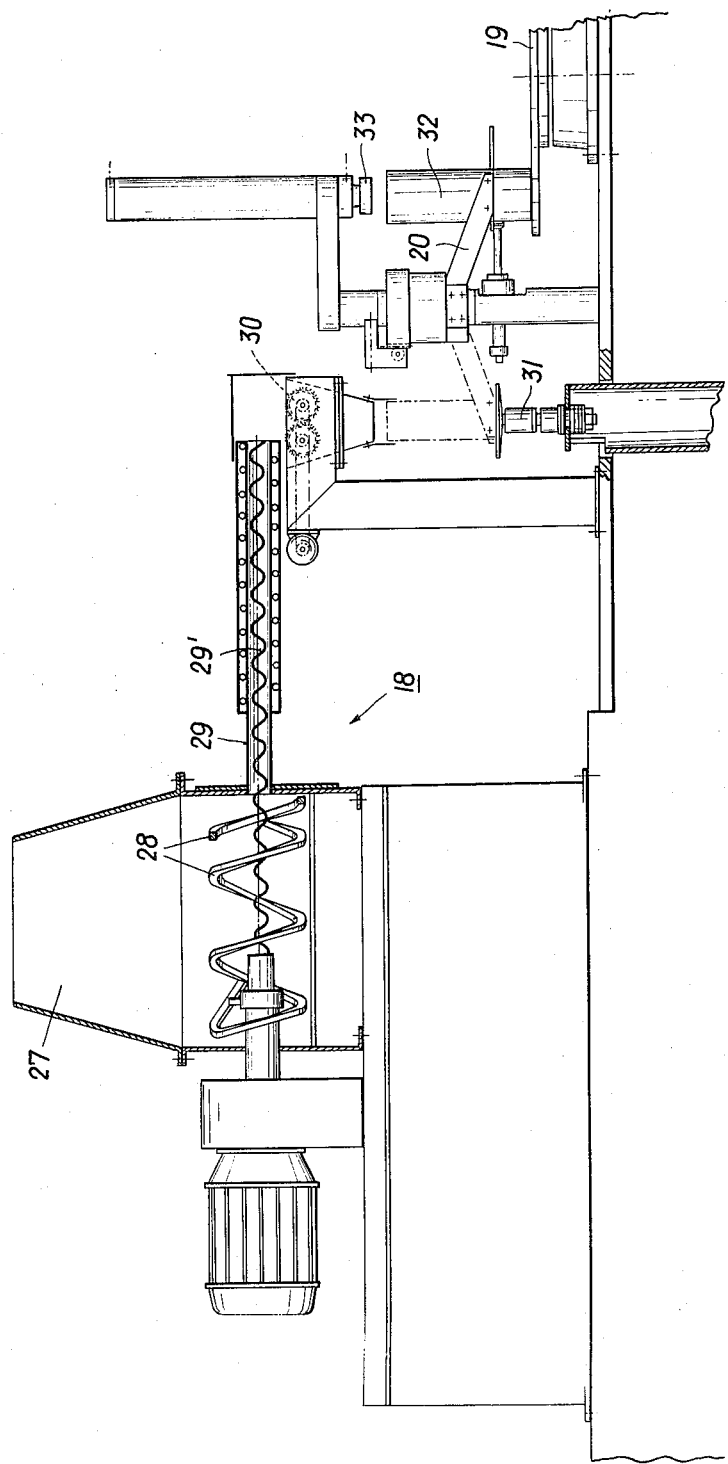
FIG. 2 is a section along line II—II of FIG. 1.
Figure 3:
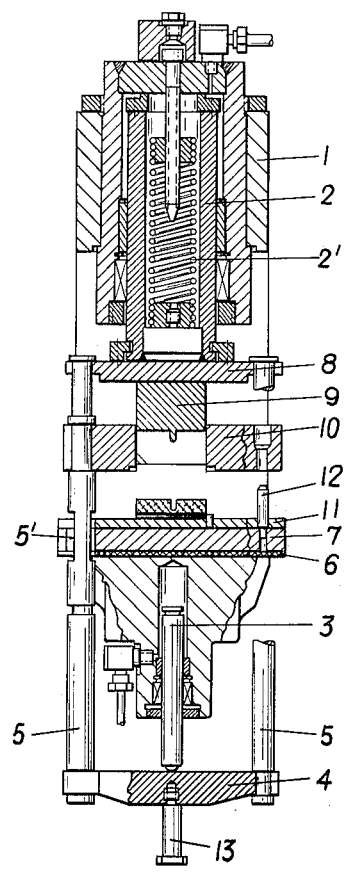
FIG. 3 shows a hot press in a sectional view in the open position for spraying the mold and for the insertion of the backing plates and the preformed pellets.
Figure 4:
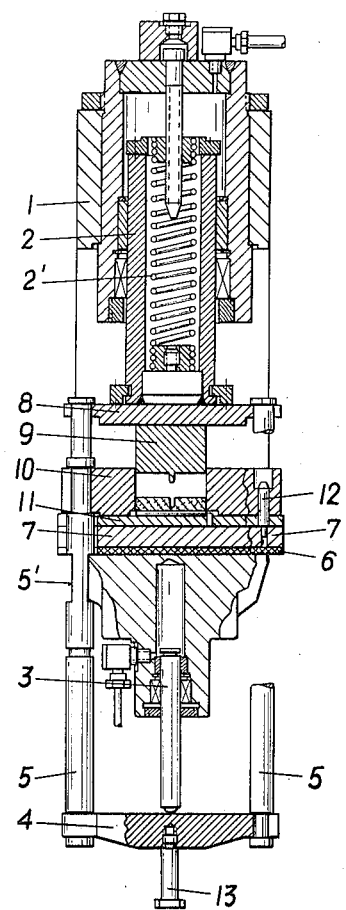
FIG. 4 shows the hot press in its position prior to and-/or after the actual hot pressing step and/or for intermediate venting.
Figure 5:
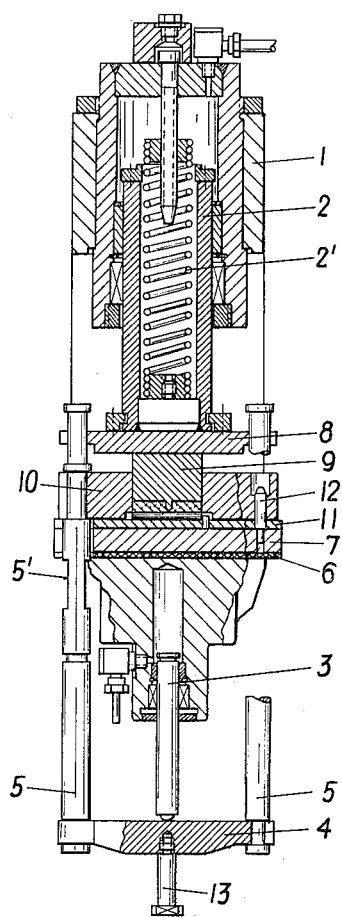
FIG. 5 shows the hot press during the high-pressure pressing step.
Figure 6:
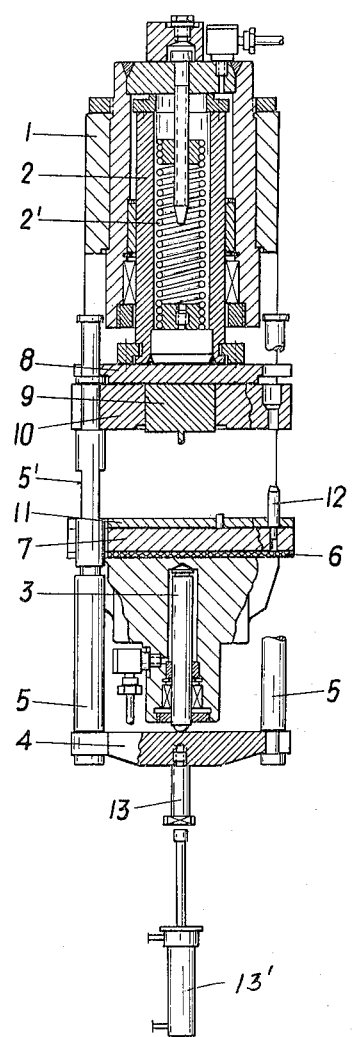
FIG. 6 shows the hot press during the ejection of a finished disc brake lining and the cleaning of the mold.

Referring now to the drawings in greater detail, and first to FIGS. 1 and 2, the apparatus for the production of prepressed pellets from a brake lining compound comprises a rotary table 19 supported on a main frame. Preheated brake lining compound is weighed with the aid of a precision metering device 18 and the compound is then pressed into a conventional pelletizing mold.

The complete discharge of the brake lining compound is effected with the aid of a container 27 flaring downwardly. In the lower trough of this container, two open screw conveyors 28 are operated for homogenizing purposes. The open screw conveyors are formed from helical coils having a tetragonal wire cross section, one coil having a right-hand helix and the other having a left-hand helix. By means of these open screws 28, the brake lining compound is loosened to such an extent that it can be discharged by discharge screw conveyor 29' disposed in the center of the hollow screws 28. The discharge screw conveyor 29' has the opposite direction of rotation to the hollow screws 28.

Screw conveyor 29' is likewise an open helical spring with a tetragonal wire cross section. Due to this construction, clogging is made impossible, since the brake lining compound, even though it becomes more compact due to the working, is conveyed in the interior of the open screws and is pushed ahead by the engagement of the discharge screw worms 29' with the casing 29.

The discharge of the brake lining compound is through casing 29 heated externally so that the brake lining compound can be heated up to about 80° C. At the discharge end of casing 29, spiked rolls 30 are provided which prevent, after the metering device has been turned off, any compound particles from being additionally fed and which divide the brake lining compound into small pieces for the accurate metering of this compound.

Beneath the discharge end of the discharge screw 29' is a weighing device 31, by which a coarse and fine metering procedure can be effected. The weighing container is fashioned as a mold 32 having roughly the shape of the desired pellet. With the aid of a pivotal feeder 20, the mold 32, after termination of the metering procedure, is introduced into a pelletizing press 21 and the compound is injected into this press with the aid of an ejector ram 33.

The pelletizing press 21 is on the rotary table 19. The main press ram is introduced from below and is first loosely suspended in the mold 32 during the charging step. After rotating one revolution, the pelletizing is conducted under a higher pressure. During the pelletizing or prepressing, the pelletizing mold is closed at the top and the die suspended in the mold is impressed from below.

The thus-produced pellet is ejected and inserted in the hot press by tongs 17, optionally together with a backing plate which is fed and preheated by means of a device 16 comprising a stack magazine 34, from which the carrier pads are withdrawn at the top by a device 35. The carrier pads pass through an applicator 36 for bonding agent, behind which a continuous oven 37 for preheating the carrier pads is arranged. The carrier pads are finally seized by the tongs 17 and fed to hot presses 1-13.

Of course it will be understood that tongs swing first one way to feed a backing plate to a hot press and then swing the other way to lay a pellet on top of that backing plate.

Referring now to FIGS. 3–6, it will be seen that the hot press proper consists of the main press cylinder 2, a pilot cylinder 3, and a set of heating plates and molds. By suitable positioning of the molding die 9 and the mold matrix 10; as well as of the pilot and main press cylinders, the backing plate with the pellet can be inserted in and ejected from the mold. Furthermore, the mold can be opened for cleaning as well as spraying. The pellet inserted therein is hot-pressed by closing the press.

After the insertion, the corresponding press station is rotated by one step, so that a new hot press enters the zone of the feeding operation. During the rotation of the presses, each press can be vented once or several times in order to discharge gas therefrom.

At the end of the rotary path, the brake lining is ejected. The mold is cleaned by means of a cleaning brush 23 (FIG. 1) in a further station; and finally, in a preparing station, the mold is sprayed with a parting agent by means of a spray head 24, so that it is ready to receive a new backing plate with a pellet. The cleaning brush 23 and the spraying head 24 can be moved into the hot press.

Fluid pressure for the various work operations is supplied by a hydraulic pump 25. The work operations are automatically controlled by conventional programmed controls that can be monitored and if necessary modified from a panel 26.

Returning now to FIGS. 3–6, it will be seen that each hot press consists of a press yoke 1 of cast steel, attached to a turntable 15 (FIG. 1) and carrying all the structural components of the hot press. In the upper arm of the press yoke 1, the main press cylinder 2 is disposed. In the base of the yoke is the pilot cylinder 3. The press yoke 1 is accurately centered on a centering plate 14 of this yoke in the feeding station (FIG. 1).

The main press cylinder 2 is fashioned as a plunger cylinder with return by means of a restoring tension spring 2' (FIGS. 3–6). The pilot cylinder 3 is a plunger cylinder without return. A die holding plate 8 is mounted with play in a groove of the piston of the main press cylinder 2. Two tie rods 5 engage the die holding plate 8; these rods are guided in a heating plate 7. In the zone of the heating plate 7, these tie rods 5 have a flattened portion 5' making it possible to introduce the rods into the heating plate 7; however, after a rotation of 90°, the rods are slidably guided on all sides.

The tie rods 5 also carry a mold 10 and a lower cross beam 4. Thereby, all components are guided in a rough fashion. The tie rods 5 have recesses so that they are fixedly attached with respect to the level of the lower cross beam 4 and in the mold 10, so that these two parts partake in each vertical movement of the tie rods 5. The die holding plate 8 has free movement in the downward direction. Once this movement is completed, the die holding plate 8 is likewise entrained by the tie rods.

A press die 9 is attached to the die holding plate 8. The press die 9 and the mold 10 together shape the disc brake lining. Depending on the desired configuration of the brake lining and/or the position of the backing plate in the brake lining, corresponding recesses are provided on the underside of the mold 10 for guiding the backing plate. The backing plate is centered by means of a mold cover plate 11. The mold cover plate 11 is placed on a heating plate 7.

During the closing of the mold, the mold 10 is centered by two guide and locking pins 12, by means of which the mold cover plate 11 is likewise centered. The mold cover plate 11 carries, on its topside, guide pins and/or milled-in recesses engaged by the backing plates. If bent backing plates are utilized, or backing plates having lugs, the mold cover plate 11 will have corresponding recesses.

An important feature of the press is that the mold die 9 is never extended out of the mold 10 and thus an exact guidance of the press piston and the other parts with respect to each other need not be otherwise provided. Also, the danger is eliminated that, during the movement of the mold die 9 into the mold 10, the parts will be damaged.

In the open position of the hot press (FIG. 3), the mold die 9 with the die holding plate 8 and the plunger is pulled upwardly to a maximum extent by the return spring 2' in the main press cylinder 2. Via the tie rods 5 which contact the die holding plate 8 in the uppermost position, the mold 10 and the cross beam 4 are likewise pulled up.

A prepressed pellet is placed on the mold cover plate 11 in the interspace between the mold cover plate 11 and the mold 10. At each hot press, a two-way valve is disposed which is switched with the aid of a control cylinder. When the operation is switched to pressing, power is thus first exerted on the pilot cylinder 3. By extending the piston of the pilot cylinder 3, the plunger of the main press cylinder 2 is pulled downwardly by the cross beam 4 and the tie rods 5, and the mold 10 is likewise pulled downwardly by the die holding plate 8 and the tie rods 5.

Once the mold 10 rests on the heating plate 7 and/or on the mold cover plate 11 (FIG. 4), the pressure in the pilot cylinder 3 rises, so that the main press cylinder 2 is supplied with hydraulic pressure by way of a relief valve, i.e., the main press cylinder 2 can press only after the mold 10 is held against the mold cover plate 11, so that the brake lining compound is prevented from running out. The pressing with the main press cylinder 2 can now be effected for any desired length of time.

Due to the free sliding of the die holding plate 8 on the tie rods 5, the material in the press can be compressed. During the pressing operation, a practically constant surface temperature of all parts coming into contact with the brake lining compound is achieved by means of heating elements (not shown) uniformly distributed in the mold 10 and in the heating plate 7. Between the heating plate 7 and the press yoke 1 is heat insulation 6.

Once the pressing step is finished, the mold 10 is held closed by a holding and pressure pin 13, while, by switching the hydraulic valve, the main press cylinder 2 is vented and is thereby lifted, with the aid of the return spring 2', to such an extent that the die holding plate 8 abuts the collar of the tie rod 5. By first lifting the press die 9, the mold 10 is prevented from lifting off first and thus the pressed material is prevented from being deformed. Simultaneously, by means of this operating step, the pressed material is detached from the press die 9. Thereafter, via a cylinder 13', the cross beam 4 is pressed upwardly at the holding pin 13 until the tie rods 5 abut the die holding plate 8. Thereby, the mold 10 is pushed entirely over the press die 9 (FIG. 6), so that the finished brake lining is pressed out of the mold. In this position, the press surfaces can also be cleaned with the aid of the retractable cleaning brush 23.

By pulling the cross beam 4 and thus the mold 10 downwardly, the entire inner space of the hot press is again vacated. In this position (FIG. 3), the molds can be sprayed with a mold release agent with the aid of the introducible spraying head. Also, the feeding step is executed in this position. By the arrangement of the pilot cylinder 3, effecting a replenishment by suction of the large amount of oil in the main press cylinder 2, the possibility is furthermore provided to utilize a very small high-pressure pump.

The embodiments illustrated and described serve merely to explain the basic concepts of the invention without limiting the same to details. Thus, it is also possible to press the compound, in the pelletizing press, directly upon the backing plates. The preheating of the compound and of the plates can also be omitted. It is furthermore possible to insert, in the plate feeding station, additional processing units, such as, for example, for the brushing or abrading of the backing plates. These and other modifications and variations are considered to be within the scope of the present invention as defined by the appended claims.

I claim:

1. Apparatus for the automatic production of brake shoes and linings, comprising a rotary table, a plurality of hot presses carried by the rotary table, a pelletizing press for forming brake lining compound into pellets, means for feeding brake lining compound to the pelletizing press, means for feeding pellets from the pelletizing press to the hot presses on the table, means for heating the brake lining compound prior to the feeding of the pellets to the presses, means for rotating the table about an upright axis with intermittent rotary motion thereby successively to bring the hot presses into registry with the pellet feeding means, and means for removing brake linings comprising hot pressed pellets from the hot presses.

2. Apparatus as claimed in claim 1, and means for feeding brake shoe backing plates to the hot presses below the pellets.

3. Apparatus as claimed in claim 2, and means for heating the backing plates prior to the feeding of the backing plates to the hot presses.

4. Apparatus as claimed in claim 2, and means for applying bonding agent to the backing plates before introduction of the backing plates into the hot presses.

5. Apparatus as claimed in claim 1, said brake lining compound feeding means comprising a pair of coaxial and axially coextensive open screw conveyors of opposite pitch, a discharge conduit for brake lining compound which has been agitated by said open screw conveyors, a further screw conveyor in said conduit, heating means for brake lining compound passing through said conduit, comminuting means for comminuting brake lining compound discharged from said conduit, weighing means for weighing predetermined quantities of brake lining compound discharged from said comminuting means, and means for transferring weighed charges of comminuted brake lining compound from said weighing means to said pelletizing press.

6. Apparatus as claimed in claim 5, the helices of said coaxial screw conveyors having a polygonal cross section.

7. Apparatus as claimed in claim 1, each hot press comprising a press yoke secured to said table, a main press cylinder carried by said press yoke, a pilot cylinder, a heating plate carried by said press yoke between said cylinders, vertical tie rods carried by the press yoke and vertically slidable relative to the heating plate and carrying at their lower ends a cross beam, a pilot piston bearing on said yoke and disposed in said pilot cylinder, a mold shaped to encompass a brake lining and carried by said tie rods, a die holding plate vertically slidable relative to said tie rods, a main press piston vertically slidable in said main press cylinder and bearing against said die holding plate, means limiting relative vertical movement of said mold and die holding plate so that a die disposed in said mold and carried by said die holding plate cannot escape the mold during a pressing operation, and means supplying fluid under pressure to said main and pilot cylinders.

8. Apparatus as claimed in claim 7, and guide and locking pins disposed between said heating plate and said mold to guide said mold and heating plate relative to each other.

9. Apparatus as claimed in claim 7, and return spring means urging said main press piston upwardly.

10. Apparatus as claimed in claim 7, and a mold cover plate disposed between said mold and said heating plate.

* * * * *